United States Patent [19]
Belk

[11] Patent Number: 4,857,173
[45] Date of Patent: Aug. 15, 1989

[54] PARTICLE CLASSIFIER AND METHOD
[75] Inventor: Thomas J. Belk, St. Louis, Mo.
[73] Assignee: Ethyl Corporation, Richmond, Va.
[21] Appl. No.: 105,867
[22] Filed: Oct. 8, 1987

Related U.S. Application Data

[63] Continuation-in-part of Ser. No. 824,537, Jan. 31, 1986, abandoned.

[51] Int. Cl.$^4$ .............................................. B07B 4/02
[52] U.S. Cl. ..................... 209/2; 209/139.1; 209/141
[58] Field of Search ............... 209/2, 136–138, 209/139.1, 140–142, 145, 146, 149, 154

[56] References Cited

U.S. PATENT DOCUMENTS

| | | | |
|---|---|---|---|
| 459,570 | 9/1891 | Beynon | 209/142 X |
| 1,650,480 | 11/1927 | Balletto | 209/138 |
| 1,650,727 | 11/1927 | Stebbins | 209/138 |
| 1,756,960 | 5/1930 | Stebbins | 209/139.1 X |
| 2,561,396 | 7/1951 | Matheson | 209/138 X |
| 2,683,685 | 7/1954 | Matheson | 209/139.1 X |
| 2,952,356 | 9/1960 | Dunlop et al. | 209/136 |
| 3,263,338 | 8/1966 | Gordon | 209/141 X |
| 3,294,236 | 12/1966 | Lagarias | 209/141 X |
| 3,441,131 | 4/1969 | Gebauer | 209/139.1 X |
| 3,494,217 | 2/1970 | Tanaka et al. | 209/138 X |
| 3,709,359 | 1/1973 | Johnson | 209/138 |
| 3,825,116 | 7/1974 | Greenwood | 209/141 |
| 3,929,628 | 12/1975 | Denevi et al. | 209/138 X |
| 4,127,476 | 11/1978 | Iannazzi | 209/138 X |
| 4,379,748 | 4/1983 | Hoogendoorn | 209/138 X |

FOREIGN PATENT DOCUMENTS

| | | | |
|---|---|---|---|
| 53-20172 | 2/1978 | Japan | 209/138 |
| 0468212 | 6/1937 | United Kingdom | 209/139.1 |

OTHER PUBLICATIONS

M. K. Valentine, *Fluidized–Bed Gas Classification of High Temperature Gas–Cooled Reactor Fuel Particles;* AIChE Symposium Series, No. 161, vol. 73, pp 74–80 (1976).

*Primary Examiner*—Robert B. Reeves
*Assistant Examiner*—Edward M. Wacyra
*Attorney, Agent, or Firm*—John F. Sieberth; Philip M. Pippenger

[57] ABSTRACT

An apparatus and process for separating silicon seed particles from silicon dust and large, heavy silicon particles. A classifier apparatus is a vertically oriented column having an inert gas flowing upwardly therethrough. A mixture of various size particles is dispensed into the central portion of the tube such that small dust particles and product size particles are entrained in the flowing gas and heavier particles fall to a receiver at the bottom of the tube. The small dust particles are separated from the product size particles near the top of the tube by providing an enlarged cross-sectional area flow path which continues to entrain the small particles but not the product size particles. The product size particles are then captured in a receptacle near the top of the tube.

8 Claims, 2 Drawing Sheets

PARTICLE CLASSIFIER AND METHOD

CROSS REFERENCE

This application is a continuation-in-part of Applicant's co-pending application Ser. No. 824,537, filed Jan. 31, 1986, and now abandoned. Subject matter herein is related to application Ser. No. 796,190, filed Nov. 8, 1985, now U.S. Pat. No. 4,691,866.

BACKGROUND OF THE INVENTION

This invention is related to the handling of particulate matter especially mixtures of particles and the classification of those particles into separate sizes.

Various commodities including metals and semiconductor materials are often available in mixtures of sizes and a grading method and apparatus are needed to separate desired size particles from smaller particles and larger particles. Often, there is a need to separate dust sized particles and heavy particles from a semiconductor product particle which is used as a seed particle for coating such as in a fluid bed apparatus.

SUMMARY OF THE INVENTION

The present invention is directed to a method and apparatus for separating product particles from a mixture of particles including the product particles, smaller particles, and larger particles. The present invention is an apparatus and process for classifying particles according to size by providing a flow of motive gas through a vertically oriented tube at such a rate that heavy particles dispensed in the middle area of the tube fall to the bottom of the tube whereas product particles and small particles are entrained in the motive gas. Thereafter, the cross-sectional area of the flow path of the gas is increased somewhat such that the product particles do not remain entrained in the motive gas but rather only the small particles remain entrained to be removed from the tube and optionally collected.

DESCRIPTION OF THE PREFERRED EMBODIMENT

Figure 1:
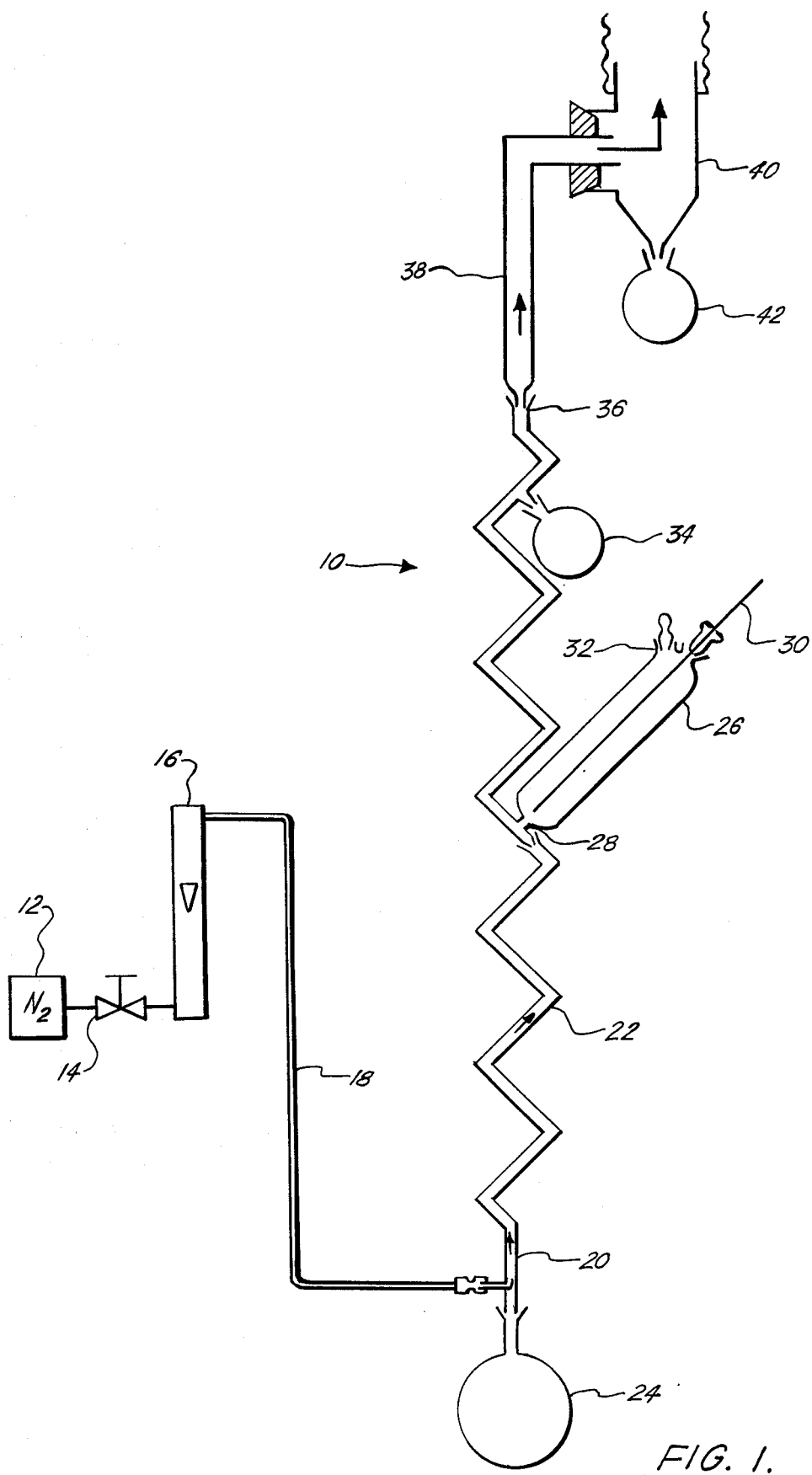
FIG. 1 is a zigzag tube classifier with a single gas flow.

A preferred embodiment of the present invention is an apparatus for classifying particles, said apparatus comprising:

a source of motive gas to flow through said apparatus for classifying particles by size;

an elongated column having an upper end, an upper rectifying section, a lower stripping section fluidly connected to said source of motive gas, and a lower end;

a feed container connected to said column between said lower stripping section and said upper rectifying section of said elongated column, said feed container having means for dispensing a mixture of sizes of particles including small particles, intermediate size product particles, and large heavy particles;

a large heavy particles receiver fluidly connected to said lower end of said elongated column to collect large heavy particles falling through the motive gas;

a product particles receiver fluidly connected near said upper end of said elongated column to collect product particles; and a product disengagement section having a top end and a bottom end, said bottom end being fluidly connected to said upper end of said elongated column to receive the flow of motive gas and small particles entrained therein, said product disengagement section having a larger cross-sectional flow path than that of said elongated column.

The apparatus of this invention does not comprise a bed of non-fluidized packing. The stripping section and the rectifying section of the column are unpacked. Preferably the entire column is devoid of non-fluidizable packing elements. The lack of non-fluidizable packing elements in the stripping section allows the large particles to drop unimpeded from the point they are fed into the separation column to the large particle receiver. This receiver is axially disposed and at the lower end of the elongated column. Since the flow of motive gas enters the device at one or more ports at the side of the column, the receiver for heavy particles need not be off-set at the bottom of the column.

The intermediate size product particles are separated from smaller particles at the product disengagement section. At that section, the velocity of motive gas is reduced below the point necessary to keep the product particles in suspension. The product particles fall back into the product receiver which is angularly disposed to the column. Thus, the collection of product particles is made at a point away from the flow of motive gas through the column, and the product particles are not removed in a stepstream of gas.

Another preferred embodiment of the invention is a process for classifying a mixture of sizes of particles including small dust particles, product particles, and large heavy particles, said process comprising the steps of:

(a) flowing a motive gas upwardly through a vertically oriented unpacked classifier column of substantially constant cross-section having an upper end and a lower end, at a velocity sufficient to entrain said small dust particles and said product particles but insufficient to prevent said large heavy particles from falling unimpeded to the lower end of said column by the force of gravity, said motive gas being introduced at a port at the side of said column above a large particle receiver;

(b) dispensing said mixture of sizes of particles into said classifier column at an intermediate point between said upper end and said lower end;

(c) flowing said motive gas and entrained small dust particles out of said upper end of said classifier column into a vertically oriented product disengagement section having a larger cross-sectional flow path than that of said classifier column whereby the velocity of said motive gas is sufficient to entrain said small dust particles but insufficient to entrain said product particles; and (d) collecting product particles by force of gravity in an angularly disposed product receiver fluidly connected above said intermediate point.

A better understanding of the invention will be had by a review of the following description taken in conjunction with the drawings.

Referring now to FIG. 1, a classifier apparatus 10 is shown. A supply 12 of pressurized nitrogen gas is available through valve 14 and meter 16 to a supply tube 18 which fluidly connects at or near the bottom end 20 of zigzag classifier column 22. A heavy particles receiver 24 is preferably sealingly connected to the bottom end 20 of column 22 below the entry port of supply tube 18. A feed container 26 is fluidly connected to column 22 and has an orifice at 28 which works in conjunction with a quartz rod 30 that serves as a needle valve and is controllable outside of feed container 26. The quartz rod 30 is sealingly engaged in the top of container 26. A ground quartz joint 32 is provided in container 26 for filling the container with a mixture of particles. The section of column 22 below the container 26 is referred to as a stripping section since it removes heavy particles from the container 26. The section of column 22 above feed container 26 is referred to as the rectifying section since it provides a flow path for motive gas containing small particles and product particles. A product receiver 34 is sealingly attached near the upper end 36 of column 22 in such a fashion that product particles fall by gravity into the product receiver 34. Connected to the upper end 36 of column 22 is a product disengagement section 38 which has a larger flow path than column 22 such that the small particles from feed container 26 remain entrained in the motive gas but the product particles do not ascend above upper end 36 of column 22 and are eventually collected in the product receiver 34.

The principle of expanding the diameter of the flow path to reduce the linear velocity of the motive gas is in turn used to precipitate the small particles from the motive gas by directing the motive gas into the fines settling chamber 40 which has a greatly expanded cross-sectional flow path so as to further reduce the velocity of the motive gas therein. Below this, offset fines settling chamber 40 is located overhead fines receiver 42 which is sealingly connected to the fines settling chamber 40. By providing the proper size diameter of the flow path of fines settling chamber 40, product disengagement section 38, and column 22, classification of a mixture of particles having a predetermined size distribution can be readily accomplished.

For example, the classifier column and product disengagement section of the invention are operated in a vertically oriented position. This position includes such variations as a slant (e.g. 45° from vertical) and alternating straight and zigzag sections. Of course the inventive process operates under the influence of the force of gravity such that particles tend to flow to the bottom of the classifier column unless the flow of motive gas is sufficient to suspend or entrain them. Also the cross section of the column may be round, square, rectangular, trapezoidal, or another configuration.

In a more preferred embodiment, a straight column rather than a zigzag column is used. While the straight column classifier gives a slightly less sharp separation of particles, it can usually be fed at a higher solids flow rate for a given flow of gas. The straight column classifier provides only a very slightly broader distribution of particles in each portion of particles collected. Since the devices of this invention use a straight or zigzag column, the flow of motive gas is more or less straight and not circular.

Separate gas flows may be established in various portions of the apparatus of the invention including the overhead fines disengagement section and thereby provide secondary stripping action. Generally, the use of a straight tube classifier raises the seed production rate and uses 30–60% less gas.

Figure 2:
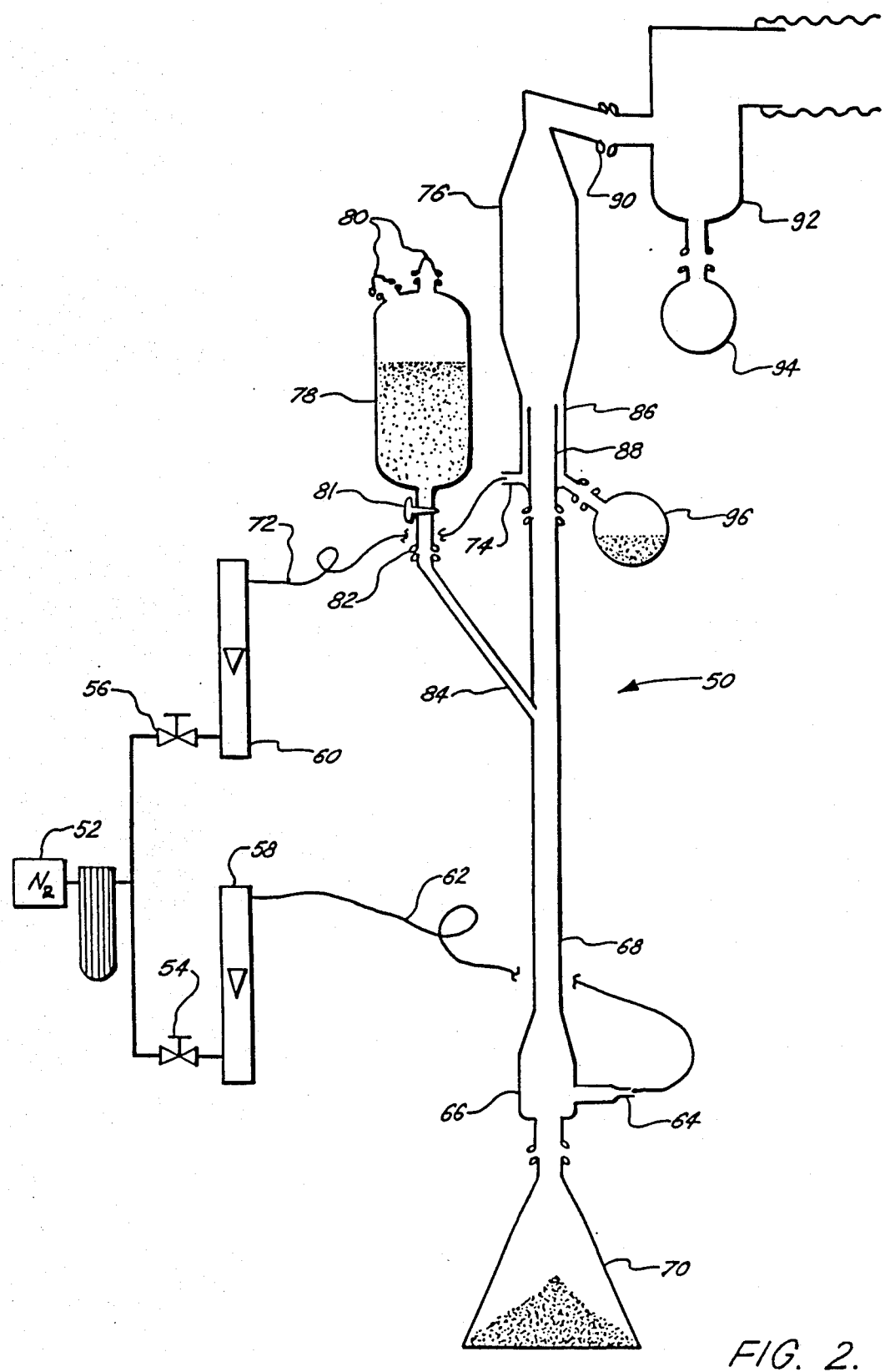
FIG. 2 is a schematic of a classifier apparatus of the invention showing the flow of a motive nitrogen gas through a vertical tube having a secondary gas flow and an annular product disengagement section to separate particles by size.

Referring now to FIG. 2, a more preferred classifier apparatus 50 of the invention is shown. A supply 52 of nitrogen gas is made available through valve 54 and valve 56 and in turn through rotameters 58 and 60. A supply tube 62 provides a first motive gas to connection 64 in the lower expanded portion 66 of straight vertical classifier tube 68. The lower expanded portion 66 of tube 68 has a three-inch outside diameter. Tube 68 has a 28 mm inside diameter and 32 mm outside diameter and is of quartz construction. The bottom of tube 68 is sealingly joined to a heavy particles receiver 70. Supply tube 72 provides a secondary motive gas flow at connection 74 of the product disengaging section 76. Feed container 78 has ball joint fittings 80 at the top thereof for filling the feed container 78 with a mixture of various size particles to be classified. Feed container 78 also has a stopcock 81 above socket joint 82 which connects to feed tube 84 for the supply of the mixture of sizes of particles to the classifier tube 68. A suitable size for the exemplary apparatus shown in FIG. 2 is a quartz feed container having an inside diameter of 130 mms and an outside diameter of 135 mms. A bottle of ten-inches in height in sufficient to contain about 4–5 kg of the mixture of particles for the example shown. The product is readily fed from stopcock 81 through feed tube 84 if the angle between feed tube 84 and classifier column 68 is about 30°. Any angle which permits flow of the mixture of particles into tube 68 is suitable.

The exemplary classifier tube 68 is formed with about three feet in length from the top of expanded portion 66 to the point where feed tube 84 joins classifier tube 68. An additional two feet of length of the exemplary classifier tube 68 extends above the point where feed tube 84 joins the classifier tube 68 and connects to the bottom intermediate diameter portion 86 of the disengaging section 76. The lower portion 86 of the disengaging section 76 has an inside circular wall 88 forming an outer concentric annular flow space between the outside wall of lower portion 86 and the circular wall 88. The distance between the wall 88 and the inside of lower portion 86 should be sufficient to avoid pluggage with particles. This distance is suitably at least about one centimeter for classification of most mixtures.

Of course an inner flow path, preferably consistent with the diameter of the tube 68, extends somewhat out of the intermediate diameter lower portion 86 and fluidly seals with the top of tube 68. Disengaging section 76 of the exemplary device suitably has an inside diameter of about 64 mms and an outside diameter of 68 mms and is formed of quartz. The upper horizontal portion of the product disengaging section 76 of the exemplary device may be reduced in diameter somewhat to about 52 mms inside diameter and 56 mms outside diameter such that an upper socket joint 90 is formed for connection with a fines disengaging section 92 having a fines receiver 94 sealingly connected thereto. The exemplary fines disengaging section 92 suitably has an inside diameter of about 90 mms and an outside diameter of 95 mms and is made of quartz to prevent contamination of the fines particles where they are recovered for subsequent use. The exemplary fines disengaging section 92 has an overall height of about 11 inches for effective capture of small dust particles at typically used flow rates.

A product receiver 96 is fluidly connected to the outer concentric flow path in the intermediate diameter lower portion 86 of product disengaging section 76. The exemplary product disengaging section 76 suitably has an overall height of about 36 inches. The inner circular wall 88 is shown in FIG. 2 as the bottom portion of a disengagement section. Alternatively and equivalent to the circular wall 88 in the product disengaging section 76, the upper end of classifier tube 68 could be extended and sealed into the disengaging section to perform the same function.

The product receiver is suitably located near the upper end of the classifier column. By near the upper end of the classifier column, I mean that it may be attached to the top of the column or to the bottom of the product disengagement section according to the particular embodiment chosen.

According to the method of operation of the nonlimiting apparatus shown in FIG. 2, the feed container 78 supplies a mixture of particles through stopcock 81 and through feed tube 84 at the rate of about 5 kg of feed in 15–20 minutes. The valve 54 is open to provide a rotameter flow of about 1 to 10, preferably 2 to 4 standard cubic feet per minute such that the gas velocity is in the range of about 1 to 20, preferably 3 to 10, feet per second through the classifier tube 68.

I have found that operation of a device like the one depicted in FIG. 2 and sized as specified above will operate at a linear gas flow rate of 6.2 feet per seconds such that ½ of a supply of 248 micron particles will travel up the tube 68 and ½ will fall down to the heavy particles receiver 70. A preferred range for operation of the classifier of the invention is about 5 to 8 feet per second linear gas flow through the classifier tube for production of seeds suitable for use in a fluid bed apparatus.

After the secondary gas flow is established through supply tube 72 to the outer concentric flow path of the lower portion 86 of product disengaging section 76, the supply of the mixture of silicon particles is started and classification is effected. The heavy particles readily drop unimpeded to the heavy particles receiver 70 and the small dust particles and product sized particles are carried out of classifier tube 68 and into the inner flow path defined by the circular wall 88 of the lower portion 86 of the product disengaging section 76.

The combined flow of motive gas from the classifier tube 68 and the secondary supply to the outer concentric flow path is insufficient to entrain the product particles in the upper portion of product disengaging section 76. However, the flow of secondary motive gas in the outer concentric flow path defined between the circular wall 88 and outer wall of the lower portion 86 of the product disengaging section 76 is sufficient to entrain small dust particles but not product particles. Accordingly, the product particles exiting the inner flow path of the lower portion 86 of the product disengaging section 76 fall back into the outer flow path and are collected in the product receiver 96. The small dust particles remain entrained in the combined flow in the upper portion of the product disengaging section 76 and are passed to the fines disengaging section 92 and optionally collected at the small dust particle receiver 94. Alternatively, the fines disengaging section 92 could be replaced with a conduit having a diameter sufficient to entrain the small dust particles until they reach a filter where they are intermittently removed on a filter outlet (not shown).

It is to be understood that the above description and drawing Figures are exemplary only and that many variations thereof are suitable for accomplishing the invention according to the inventive process and apparatus.

When a high purity mixture of particles is classified with the apparatus or by the method of the invention, it is preferable to use a noncontaminating substance for contact with the various sized particles that are classified. For example, when high purity silicon such as silicon that is 99.99999% pure is classified in the apparatus, it is preferable to use materials such as quartz, sialon, and high purity silicon itself, preferably of an equivalent purity. By "noncontaminating to high purity silicon", I mean substances which do not adversely affect the purity of the silicon by imparting to the silicon any significant amount of atoms of contaminants such as boron, phosphorus, iron, carbon, arsenic, and the like. The determination of what is a signficant contamination is necessarily based upon the purity of the silicon particles mixture.

EXAMPLE I

A plexiglass zigzag classifier was constructed from plexiglass square tubing having one inch by two inch inside wall dimensions and having 120 angles between zigs and zags. The unit was satisfactorily operated with a mixture of silicon particles to separate medium sized product particles from dust and heavy particles.

In an initial test of the apparatus, three rectifying stages and three stripping stages were used above and below the feed container respectively (each stage is a zig and a zag). In another series of runs, five rectifying stages and three stripping stages were used and an improved result was obtained.

EXAMPLE II

A larger plexiglass classifier was constructed of rectangular cross-section pieces having two inch by five inch inside dimensions capable of handling 2.0 to 2.5 kilograms per minute of a feed mixture of silicon particles so as to obtain 30 to 45 kilograms of seed particles per hour, the seed particles having a dimension of about 100 to 300 microns. The apparatus has six stripping stages and seven rectifying stages.

EXAMPLE III

A straight column vertical classifier was constructed and found to give a slightly less sharp separation of particles but to permit operation with a much higher flow rate of a mixture of sizes of particles while requiring less gas flow. The zigzag classifiers did a better job of removing the unwanted smaller particles of less than about 88 microns due to secondary stripping action peculiar to their design (not found in the straight tube).

Referring to an apparatus as described in FIG. 2, a flow of 2.46 standard cubic feet per minute nitrogen was established through rotameter 58. A flow of 1.65 standard cubic feet per minute nitrogen secondary gas flow was established through rotameter 60. A flow of silicon solid particles mixture was started through stopcock 81. Over a period of 17 minutes, 13 seconds a total of 6516.8 grams was fed (348.4 grams/minute). The particle size distribution for the feed mixture was as follows:

| Particle Diameter Range (microns) | Weight Percent |
| --- | --- |
| 0–149 | 9.9 |
| 150–299 | 16.4 |

| Particle Diameter Range (microns) | Weight Percent |
| --- | --- |
| 300–416 | 23.8 |
| 417–499 | 12.7 |
| 500–709 | 21.0 |
| 710–999 | 11.5 |
| 1000 + | 4.6 |
| | 99.9 |

The collected seed product in product receiver 96 amounted to 1349.0 grams, 20.70 weight percent of the feed mixture, and had the following particle size distribution:

| Particle Diameter Range (microns) | Weight Percent |
| --- | --- |
| 0–87 | 4.0 |
| 88–105 | 3.0 |
| 106–149 | 18.8 |
| 150–211 | 53.4 |
| 212–299 | 15.4 |
| 300–416 | 5.4 |
| 417 + | 0 |
| | 100.0 |

The collected overhead dust in fines receiver 94 amounted to 297.2 grams, 4.56 weight percent of the feed mixture, and had the following particle size distribution.

| Particle Diameter Range (microns) | Weight Percent |
| --- | --- |
| 0–44 | 27.8 |
| 45–87 | 54.9 |
| 88–105 | 2.8 |
| 106–149 | 12.9 |
| 150–211 | 1.5 |
| 212–299 | less than 0.1 |
| 300 + | 0.1 |
| | 100.0 |

The collected heavies in heavy particles receiver 70 amounted to 4787.0 grams, 73.46 weight percent of the feed mixture, and had the following particle size distribution:

| Particle Diameter Range (microns) | Weight Percent |
| --- | --- |
| 0–149 | 0.1 |
| 150–299 | 5.5 |
| 300–416 | 20.6 |
| 417–499 | 12.9 |
| 500–709 | 30.1 |
| 710–999 | 21.3 |
| 1000 + | 9.6 |
| | 100.1 |

A material balance on the classifier apparatus 50 shows a loss of dust fines of 83.6 grams, 1.28 weight percent of the feed mixture entrained in the exhaust gas. The overall seed yield was increased to about 65 weight percent by recycling the collected heavies through a seed generator and then classifier apparatus 50.

The process and apparatus of this invention classify particles by size. They can preferably be used to classify particles (by size) of a substantially homogeneous substance, i.e. not a mixture of substances. The solids separation does not depend on use of a mixture of substances having different densities.

The skilled artisan will recognize that various sizes of classifying column may be used and various constructions of the column may also be used so long as the flow of gas is generally against the acceleration of gravity such that heavy particles flow to the bottom of the column. A broad range of cross-sectional area may be used for the flow path of columns to separate mixtures of silicon particles containing silicon product particles.

As can readily be appreciated, the flow of gas varies greatly depending upon the nature and mixture of sizes of materials to be classified and the inside cross-sectional flow path area of the gas. A nonlimiting typical suitable range of linear gas velocities for classification of silicon particles for intermediate sized product particles to be used as seeds in a fluid bed is about 5 to 20 feet per second, preferably 6–8 feet per second.

Various gases are suitable for the operation of the invention. However, it is preferred to use an inert gas such as nitrogen or a noble gas including argon, helium, and the like.

A suitable means for dispensing the mixture of sizes of particles into the classifier column is a tapered needle valve device which may be operated from outside the feed container. The needle valve may be sealed with an o-ring or similar device to prevent gas leakage. More preferably a quartz stopcock lightly greased at the outer ends controls particle entry.

While it may be possible to operate the apparatus and process of the invention without sealing the bottom end of the classifier tube to the receiver of the large heavy particles, it is to preferred to sealingly connect the heavy particle receiver to the bottom end of the tube to prevent gas leakage.

It is preferable, when using high purity materials such as high purity silicon to be used as seeds in a fluid bed apparatus, to construct the classifier apparatus of the invention of materials that do not contaminate the silicon seeds. It is also preferable to ensure that the entire inside portion of the classifier is of a noncontaminating material since the large heavy particles which descend to the bottom end of the classifier tube may be crushed or fractured into smaller particles, some of which end up in use as silicon seeds for a fluid bed process.

Various materials may be used to construct the invention. Where a mixture of high purity particles is to be classified, it is preferable to coat the inside of the feed container, column, and any other portions contacting the various sized products withdrawn with a material which does not contaminate such products. In the case of silicon, the suitable materials of construction are silicon, quartz, sialon, and the like.

A small zigzag apparatus for separation of silicon seeds from large heavy particles and from dust particles is a 16 mm square inside dimension quartz column having zigzag sections of 120. angles. The product disengagement section may then be sized to have about 38 mm inside dimension. In this construction, a four inch pyrex tube may be used as a fines settling chamber such that most of the dust will not be expelled therefrom by entrainment in the exhaust gas. In this arrangement, a suitable range of flows for the motive gas is about 5 to 20 feet per second.

Alternatively, a highly preferred apparatus and method have a straight vertical flow path of 28 mm in the primary separator and 64 mm in the product disengaging section, 5 to 10 feet per second linear nitrogen flow in the primary separator and about 1.5 to 2.5 feet per second in the product disengaging section. An annular section is used above the product receiver to enhance dust separation.

Having described my invention it will be apparent to those skilled in the art that the various constructions and elements of the process of the invention may be varied somewhat without departing from the lawful scope or spirit thereof.

I claim:

1. A process for classifying a mixture of high purity silicon particles including small dust particles, product particles, and large heavy particles, said process comprising the steps of:

(a) injecting a motive, inert gas upwardly through a vertically oriented unpacked classifier column that is non-contaiminating to high purity silicon and of substantially constant cross-section, said column having an upper end and a lower end, at a velocity sufficient to entrain said small dust particles and said product particles but insufficient to prevent said large heavy particles from falling unimpeded to the lower end of said column by the force of gravity, said motive gas being introduced at a port at the side of said column above a large particle receiver;

(b) dispensing said mixture of sizes of particles into said classifier column at an intermediate point between said upper end and said lower end;

(c) flowing said motive gas and entrained small dust particles out of said upper end of said classifier column into a vertically oriented product disengagement section having a larger cross-sectional flow path than that of said classifier column whereby the velocity of said motive gas is sufficient to entrain said small dust particles but insufficient to entrain said product particles;

(d) collecting product particles by force of gravity in an angularly disposed product receiver fluidly connected above said intermediate point; and (e) introducing a second flow of motive gas into said product disengaging section.

2. The process of claim 1, wherein (a) said large heavy particles falling from said lower end of said classifier column are collected in a closed heavy particle receiver fluidly connected and vertically disposed to said lower end of said classifier column; and (b) said motive gas is supplied to said classifier column above said lower end but below said intermediate point where said mixture of sizes of particles is dispensed.

3. The process of claim 1 being further characterized in that said second flow of motive gas is introduced into an annular flow section of said product disengaging section.

4. The process of claim 1 wherein said vertically oriented classifier column has at least a portion thereof of a zigzag configuration to enhance the separation of particles therein.

5. The process of claim 1 wherein said product particles are about 88 to 400 microns means diameter and said motive gas is flowed through said column at a linear flow rate of about 5 to 10 feet per second.

6. An apparatus for classifying particles according to size, said apparatus comprising:

an elongated, unpacked, straight column of substantially constant cross-section having an upper end, an upper monoaxial rectifying section, a lower monoaxial stripping section, and a lower end;

a feed container transversely connected to said column between said lower unpacked stripping section and said upper unpacked rectifying section of said elongated column, said feed container having means for dispensing a mixture of sizes of particles including small particles, intermediate size product particles, and large heavy particles;

a large heavy particles receiver fluidly connected, and co-axially vertically disposed to said lower end of said elongated column to collect large particles that fall unimpeded through said column;

a product disengagement section having a top end and a bottom end, said bottom end being fluidly connected to said upper end of said elongated column to receive a flow of motive gas having intermediate product and small particles entrained therein, said product disengagement section having a larger cross-sectional flow path than that of said elongated column, said product disengagement section being further characterized by having a top portion and a bottom annular portion defining an outer concentric flow space and an inner flow path, said inner flow path receiving the flow of motive gas and entrained particles from said elongated column;

a product particles receiver fluidly connected to said outer concentric flow space and angularly disposed to said elongated column to collect product particles that fall back into said receiver thereby removing, without the aid of a stream of motive gas, product particles from small particles;

means for introducing a non-circular flow of motive gas through said elongated column, said introducing means being transverse to and at or near the lower end of said column such that said motive gas is introduced into said column above said heavy particles receiver, and at a flow rate insufficient to suspend said larger particles that fall unimpeded through said column; and means for introducing a second stream of motive gas in said outer concentric flow space at a position thereof spatially disposed to the fluid connection of said product particles receiver.

7. The apparatus of claim 6, further comprising (a) a fines settling chamber fluidly connected and horizontally disposed to said top end of said product disengagement section, said chamber having a larger cross-sectional flow path than said product disengagement section to reduce the velocity of the motive gas and thereby allow small particles in the motive gas to settle; and (b) a fines receiver connected to said fines settling chamber to collect small particles.

8. The apparatus of claim 6, wherein said outer concentric flow space is defined by an inner wall and an outer wall of said bottom annular portion, and wherein the distance between said inner wall and said outer wall is at least about one centimeter.

* * * * *